Aug. 19, 1947.   J. M. DODWELL   2,425,731
CLUTCH
Filed Oct. 5, 1942   2 Sheets-Sheet 1

INVENTOR
J. M. DODWELL
BY Fetherstonhaugh & Co.
ATTORNEYS

Patented Aug. 19, 1947

2,425,731

UNITED STATES PATENT OFFICE 2,425,731

CLUTCH

John M. Dodwell, Shawbridge, Quebec, Canada

Application October 5, 1942, Serial No. 460,904

13 Claims. (Cl. 192—41)

This invention relates to improvements in clutches of the type generally known as free-wheeling or over-running clutches.

The principal object is the provision of an efficient and durable free-wheeling clutch which is quieter in operation and less subject to wear and jamming as compared with the free-wheeling clutches now in use and is also considerably more economical as regards production, installation and maintenance costs.

A further object is the provision of a free-wheeling clutch including novel means for preventing damage due to overloading.

A still further object is the provision of a free-wheeling clutch characterized by a very efficient application of the V-belt driving principle.

The foregoing and other objects, as well as the characteristic features of the invention, will be more readily understood from the following detailed description taken in connection with the accompanying drawings, in which—

Figure 1:
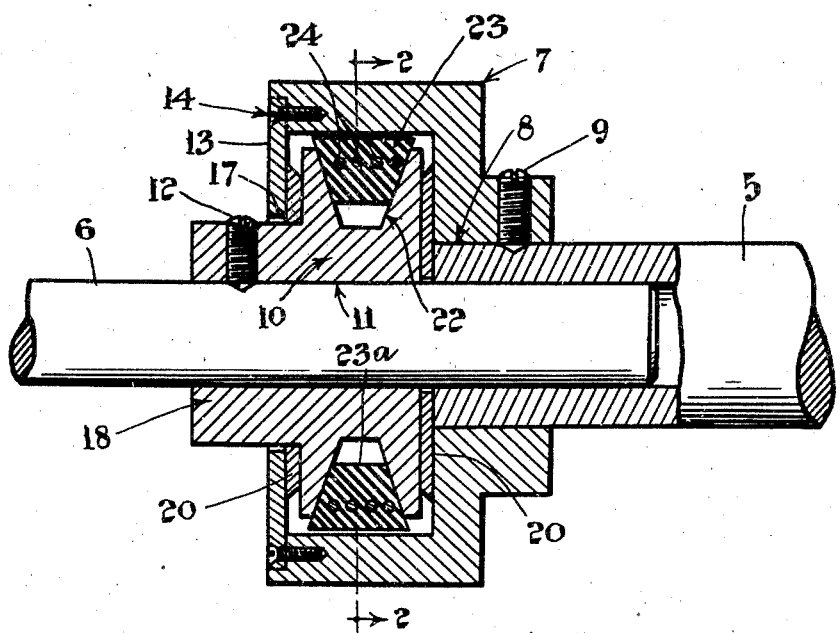
Fig. 1 is a vertical sectional view of my improved clutch.
Figure 2:
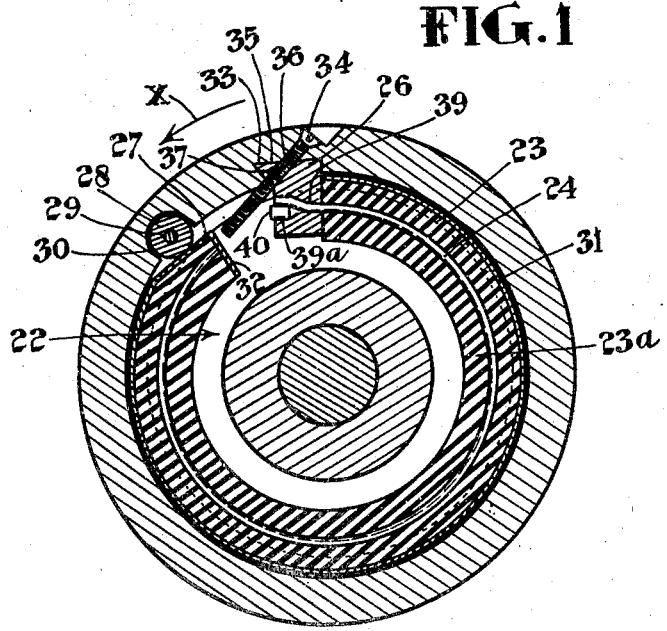
Fig. 2 is a sectional view taken along the line 2—2 of Fig. 1.

The clutch shown in Figs. 1 and 2 comprises coaxial driving and driven shafts respectively indicated at 5 and 6, the driven shaft having one end fitted in and rotatably supported by the adjacent hollow end of the driving shaft. If desired, a suitable bushing may be fitted in shaft 5 to provide a bearing for shaft 6.

Shaft 5 carries a cup-shaped female clutch member 7 provided with an axial opening 8 in which said shaft is secured by a set screw 9 or other fastening means. The shaft 6 carries a male clutch member 10 which is fitted in the cup-shaped cavity of member 7 and is provided with an axial opening 11 through which shaft 6 extends, said member 10 being fastened to shaft 6 by a set screw 12 or other suitable fastening means. After member 10 has been fitted in the cup-shaped cavity of member 7 the open side of said cavity is closed by a removable cover plate 13 which is secured in place by screws 14 or other suitable fastening means. This cover plate is provided with a central opening 7 for the passage of a hub extension 18 which carries the set screw 12. Thrust washers 20 are arranged between the sides of the male member 10 and the adjacent sides of the enclosing casing formed by the female member 7 and its cover 13.

The driven clutch member 10 is provided with an annular V-groove 22 in which is fitted a clutching element 23 comprising a precurved and substantially circular torque-transmitting band 23a which may be of any suitable material but is preferably made of the composite rubber and fabric material ordinarily employed in the manufacture of V-belts and has stretch controlling reinforcing cords 24 embedded therein, said band being formed so that, in cross section, it resembles a section of V-belt, the outer periphery of the band being wider than the inner periphery and the sides of the band being sloped at an angle which corresponds with the slope angle of the side walls of groove 22, said angle being predetermined so that when the torque-transmitting band is tightly tensioned around the driven member 10 the sides of the band will be forced into driving engagement with the sloping side walls of the groove 22 throughout the entire length of the band in such manner that efficient traction is obtained between the band and the driven member without danger of the band sticking in the groove when the clutch is at rest or is free-wheeling. The molded friction material now commonly used in many types of brakes may also be mentioned as a suitable material for the band 23a.

One end of band 23a is suitably anchored to a removable key 26 carried by the annular cavity forming wall of clutch member 7, the other end of said band being slightly tapered at its outer surface as indicated at 27 and being extended beneath a roller 28 which is journalled on a shaft 29 so that it revolves within an internal recess 30 of member 7, said roller 28 being mounted so that it projects into the cavity of member 7 a distance equal to approximately one-third the diameter of the roller.

A metal strip 31 extends around and is firmly secured to the outer peripheral surface of the band 23a, one end of said strip terminating at the key 26 and the other end of said strip being bent as indicated at 32 to cover the free end of the band.

The previously mentioned key 26 is provided with a dove-tail portion 33 which is slidably fitted in a dove-tail slot 35 provided in the cavity forming wall of member 7, said key being held against displacement by a tangentially inclined screw 34 which is threaded through inclined openings 36 and 37 formed, respectively, in the member 7 and the key 26, the inner end of said screw serving as an adjustable stop which is engaged at times by the bent band covering end 32 of the metal strip 31.

The band 23a is precurved so that it normally tends to contract to a small diameter such as to cause the inclined sides of the band to frictionally engage the sloping side walls of the groove 22.

When shafts 5 and 6 are rotating in the direction indicated by the arrow X, with shaft 5 turning faster than shaft 6, the member 7 tends to pull the band 23a around the member 10 but this movement of the band relative to member 10 is resisted by the frictional engagement obtaining between the band and the side walls of the groove 22. The band is thus tensioned between members 7 and 10 and is tightened around the member 10 so that it wedges itself deeper into the groove 22 to establish an effective driving connection between the two members.

As the band 23a is tightened around member 10, the ends of the band are drawn toward each other and the roller 28 moved relatively to the free end of the band in a direction away from the key 26, thus causing the free end of the band to be deflected inwardly into tighter frictional contact with the side walls of grove 22. The extent to which the ends of the band 23a are permitted to approach each other determines the driving torque developed by the tensioning of the band around the driven member and it is desirable that this driving torque should be prevented from exceeding a predetermined value in order to prevent damage to the clutch due to overloading. In the clutch described herein such overloading is prevented by appropriate adjustment of the screw 34 which functions as a stop engageable with the free end of the band to predetermine the extent to which the ends of the band are permitted to be drawn together during the tensioning of the band around the member 10. By adjusting the screw 34 it is possible to so regulate the tensioning or tightening of the band 23a around the driven member 10 that slippage between the band and the driven member 10 will occur under overloading conditions.

In the present instance I have shown a key 26 provided with cord receiving openings 39 through which projecting ends of the reinforcing cords 24 of band member 23a are passed, said openings 39 being enlarged at one end as indicated at 39a to receive cord wedging pins 40 by means of which the cords are securely anchored in said openings. It will be understood, however, that various other schemes may be employed for attaching the band 23a to key 26 and for attaching the latter to the driving member 7, the arrangement shown in the present drawings being merely cited by way of example.

In the foregoing I have described the manner in which the band 23a is utilized to establish a drive connection between the driving member 7 and the driven member 10. If, subsequent to the establishment of this driving connection, the driven clutch member 10 commences to overrun the driving member 7, the band 23a is relieved of tension and expanded by reason of its friction engagement with the member 10 and thus moves outwardly with reference to the bottom wall of groove 22 to lessen the frictional contact between the side walls of the groove and the sides of the band. During this expansion of the band the free end thereof moves relatively to the roller 28 in a direction away from the key 26 and is thus permitted to move outwardly to its normal position. In the expanded condition of the band 23a the driven member 10 is free to over-run the driving member 7. It may also be pointed out here that, in the free-wheeling or over-running condition of the clutch, the centrifugal force acting on the band 23a also tends to force the band outwardly away from the bottom wall of the groove 22 to further lessen the frictional contact obtaining between the band and the side walls of the groove.

Figure 3:
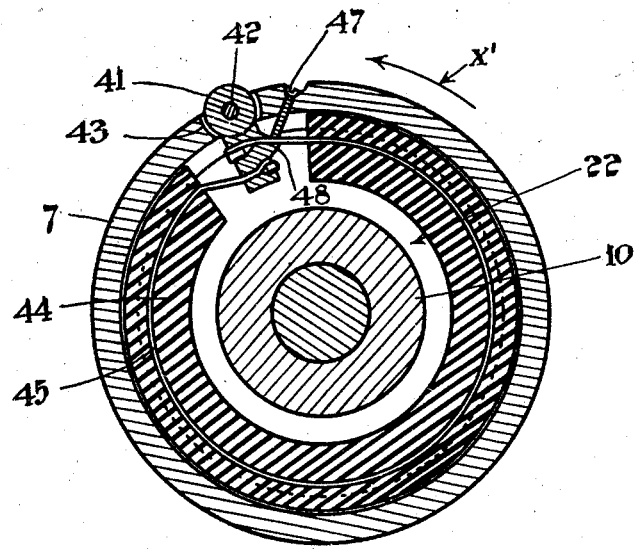
Fig. 3 is a view similar to Fig. 2 but showing a slight modification.

In the modified construction shown in Fig. 3 a band contracting and expanding lever 41 is mounted to swing about a fulcrum or pivot shaft 42 arranged within a slot 43 provided in the cavity forming wall of the driving member 7. This lever extends into the groove 22 of the driven member 10 and is secured to both ends of the band 44 in such a manner that the band is contracted to establish a drive connection between the driving and driven members of the clutch when said members are rotating in the same direction as indicated by the arrow X' with the driving member turning faster than the driven member, the driving connection thus established being disrupted by expansion of the band when the clutch is at rest or is operating under free-wheeling conditions in which the driven member is turning faster than the driving member. In this connection it will be noted that the left hand ends of the band reinforcing cords 45 shown in Fig. 3 are extended beyond the corresponding end of the band and anchored to the lever 41 adjacent the inner end of the lever or, in other words, at a predetermined distance from the lever fulcrum 42. It will also be noted that the right hand ends of the cords 45 are extended beyond the right hand end of the band and anchored to the lever at a suitable point in the length of the lever lying between the lever fulcrum 42 and the points of anchorage of the left hand ends of the cords. With this arrangement it will be seen that, when the driving member 7 rotates in a counter-clockwise direction relatively to the driven member 10, that portion of the lever 41 which is secured to the ends of the band will swing to the right and thus cause the ends of the band to be drawn together, thereby tightening the band about the driven member 10 to establish the required drive connection. When the driven member 10 overruns the driving member 7 the portion of the lever secured to the ends of the band will swing to the left about the fulcrum 41 and thus permits the band to expand out of driving engagement with the driven member 10.

Figure 4:
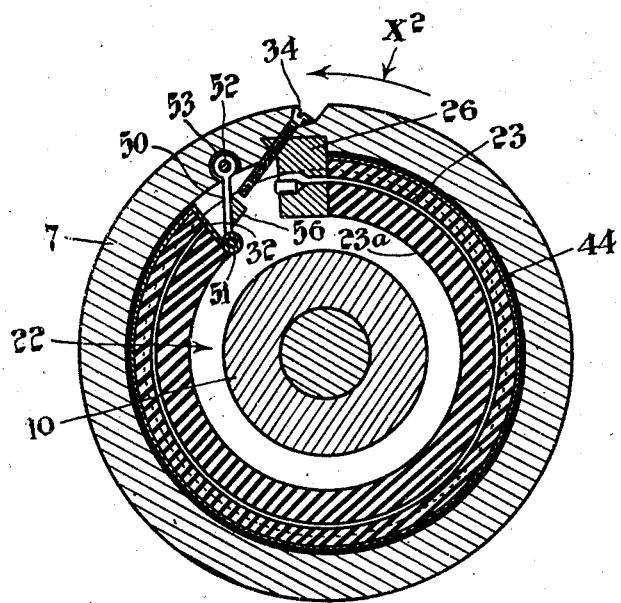
Fig. 4 is a view similiar to Figs. 2 and 3 but showing a further modification.

The band 44 shown in Fig. 4 is precurved so that it normally tends to contract into driving engagement with the driven member 10 when free to do so. An inclined screw 47 is threaded through the cavity forming wall of the driving member 7 and is adapted to engage a part 48 of the lever 41 to limit the extent to which band 44 may be contracted by swinging movement of the lever. In general the screw 47 serves the same purpose as the previously mentioned screw 34 since it prevents overloading of the clutch by excessive tightening of the band around the driven member 10. The band reinforcing cords 45 are shown fastened to lever 41 by cord anchoring means of the type previously described in connection with Figs 1 and 2 but it will be understood that the invention contemplates the use of any other suitable type of cord anchoring means for securing cords 45 to lever 41.

The modified construction shown in Fig. 4 is substantially the same as that disclosed in Fig 1, except that the roller 28 is eliminated and replaced by an inclined link or shackle 50 having its inner portion pivotally connected to the bent end of the metal band covering strip 31 as indicated at 51 and its outer end mounted to swing about a pivot 52 arranged in a slot 53 formed in the cavity forming wall of the driving member 7.

In the operation of the clutch shown in Fig. 4 the link or shackle 50 acts as a lever which is swung in an anti-clockwise direction about its fulcrum to tighten the band 23a around the driven member 10 when the driving and driven members of the clutch are rotating in the direction indicated by the arrow $X^2$ with the driving member turning at a higher speed than the driven member. This will be readily understood since the link or shackle 50 is normally inclined so that the initial turning movement of the driving member 7 relative to the driven member 10 in the direction indicated by the arrow $X^2$ causes the link or shackle 50 to swing toward a more truly radial position since the drag of the driven member on the free end of the band 23a tends to hold the band end of the link or shackle 50 stationary while the outer end is being carried around by the driving member.

In the construction shown in Fig. 4 the torque-regulating screw 34 cooperates with a part 56 of the link or shackle 50.

Having thus described my invention, what I claim is:

1. An over-running clutch comprising a pair of relatively rotatable members and means functioning automatically, in response to predetermined relative rotation of said members, to clutch said members together in such manner that the member which is functioning as the driven member is permited to over-run the member which is functioning as the driving member when the speed of rotation of the driven member exceeds or tends to exceed that of the driving member, said means comprising a band extending around a cylindrical surface portion of one member in relatively light frictional engagement therewith, the ends of the band being spaced apart, means anchoring both ends of the band to the remaining member and functioning, in response to the aforesaid relative rotation of the members, to draw the ends of the band toward each other to thereby increase the friction between the band and said cylindrical surface and adjustable means for limiting the extent to which the ends of the band are drawn together by the last mentioned means.

2. An over-running clutch comprising a rotatably mounted member provided with an annular V-groove extending around a peripheral portion thereof, a second member rotatable relatively to said grooved member and means functioning, in response to predetermined relative rotation of said members, to clutch said members together in such manner that the member which is functioning as the driven member is permitted to over-run the member which is functioning as the driving member when the speed of rotation of the driven member exceeds or tends to exceed that of the driving member, said means being arranged in frictional contact with the side walls of said groove, being free of attachment to the first mentioned member and being secured to the second mentioned member in such manner that the friction obtaining between said means and the side walls of the groove is increased by movement of said means toward the bottom wall of said groove in response to the aforesaid predetermined relative rotation of said members and means functioning, during the aforesaid relative rotation of said members, to prevent the friction between the first mentioned means and the side walls of the groove being increased above a predetermined maximum torque transmitting value.

3. An over-running clutch comprising a pair of co-axial, relatively rotatable shafts, a member mounted to rotate with one of said shafts, a band extending around a portion of said member with the ends of the band spaced apart in circumferential alignment with each other, a second member co-axial with the first mentioned member and mounted to rotate with the other of said shafts, said second member presenting a continuous annular wall overlying the band encircled portion of the first member means anchoring one end of said band to the annular wall of the second member, and band deflecting means carried by said annular wall and functioning, in response to predetermined relative rotation of said members, to press the opposite end of the band tightly against the first mentioned member, said band deflecting means comprising a band-engaging roller mounted on a shaft which is secured to the annular wall of the second member to travel therewith.

4. An over-running clutch as set forth in claim 3 in which the roller-engaging end of the band is provided with an inclined or tapered roller-engaging surface.

5. An over-running clutch comprising a rotatably mounted member, a band extending around a portion of said member with the ends of the band spaced apart in circumferential alignment with each other, a second member mounted in co-axial relationship with the first mentioned member and capable of rotation relative thereto, means anchoring one end of said band to the second member, means functioning, in response to predetermined relative rotation of said members, to press the opposite end of the band tightly against the first mentioned member so that the distance between the ends of the band is lessened by the aforesaid relative rotation of the members, thus tightening the band around the first mentioned member and establishing an effective drive connection between said members, and adjustable stop means engageable with one end of said band to limit the extent to which the ends of the band may be drawn toward each other during the tightening of the band around the first mentioned member.

6. An over-running clutch comprising two co-axial relatively rotatable members presenting opposing annular surfaces arranged one within the other in radially spaced relation, a driving band interposed between said surfaces and extending around the same with the ends of the band spaced apart in circumferential alignment with each other, a lever interposed between the ends of the band and mounted to swing about a fixed fulcrum carried by one of said members, means connecting one end of the band to the lever at a predetermined distance from the lever fulcrum, means connecting the opposite end of the band to the lever at a predetermined point located between said fulcrum and the point of connection between the lever and the first mentioned end of the band, said lever functioning, in response to predetermined relative rotation of the members to force said band into tight frictional engagement with the annular surface which is opposed to the annular surface of the lever-carrying member.

7. An over-running clutch as set forth in claim 6, including adjustable means arranged to limit swinging movement of said lever in such manner as to prevent the friction between the band and the annular surface against which the band is pressed exceeding a predetermined torque transmitting value.

8. An over-running clutch comprising two co-axial relatively rotatable members presenting interfitting annular portions arranged one within the other in radially spaced relation, a driving band interposed between said annular portions and extending around the same with the ends of the band spaced apart in circumferential alignment with each other, a link having one end pivoted to one of said annular portions and the other end pivoted to one end of said band and means immovably anchoring the other end of the band to the same annular portion to which the link is pivoted, said band being in frictional contact with the annular portion which is opposed to the link-carrying annuar portion and said link being normally arranged so that it functions, in response to predetermined relative movement of said members to force the connected end of the band tightly against the annular portion opposing that to which the link is connected.

9. An over-running clutch of the kind in which the driven member is permitted to over-run the driving member while both members are rotating in the same direction, said clutch comprising rotatable driving and driven members, one of said members having a circumferential groove with diverging side walls and the other member presenting a continuous annular wall overlying said groove, a torque-transmitting band arranged in said groove free of attachment to the grooved member, and means securing said band to said annular wall so that the band is automatically tensioned around the grooved member to cause the two members to rotate as a unit when the speed of the driving member exceeds or tends to exceed that of the driven member and is automatically relaxed while both members are rotating in the same direction to permit the driven member to over-run the driving member when the speed of the driven member exceeds or tends to exceed that of the driving member.

10. An over-running clutch as set forth in claim 9, in which said torque-transmitting band has one end secured to said annular wall and the other end free.

11. In an over-running clutch of the kind described, rotatable driving and driven members, one of said members having a circumferential groove with diverging side walls, and a precurved, form-retaining, torque-transmitting band arranged in frictional contact with the side walls of the groove free of attachment to said member and having one end only anchored to the other member, the arrangement being such that, when the clutch is at rest, the band bears against the side walls of the groove with a relatively light pressure sufficient to ensure lengthwise tensioning of the band between said members when the driving member is rotated in a clutch engaging direction relative to the driven member, said lengthwise tensioning of the band serving to increase the pressure thereof against the side walls of the groove sufficiently to cause the driven member to rotate with the driving member.

12. In an over-running clutch of the kind described, rotatable driving and driven members, one of said members having a circumferential groove with outwardly diverging side walls, a torque-transmitting band extending around said groove in frictional contact with the side walls thereof and having one end anchored to the other member, the remaining end of the band being free and contained within said groove, the arrangement being such that, when the clutch is at rest, the band bears against the side walls of the groove with a relatively light pressure sufficient to ensure lengthwise tensioning of the band between said members when the driving member is rotated in a clutch engaging direction relative to the driven member, said lengthwise tensioning of the band serving to increase the pressure thereof against the side walls of the groove sufficiently to cause the driven member to rotate with the driving member.

13. An over-running clutch as set forth in claim 9, characterised in that the torque-transmitting band is a circularly precurved, form-retaining band normally tending to contract into frictional engagement with the side walls of the groove.

JOHN M. DODWELL.

REFERENCES CITED

The following references are of record in the file of this patent:

UNITED STATES PATENTS

| Number | Name | Date |
|---|---|---|
| 1,985,387 | Starkey | Dec. 25, 1934 |
| 2,317,481 | Peterson et al. | Apr. 27, 1943 |
| 555,739 | Sanford et al. | Mar. 3, 1896 |
| 613,766 | Hodgkinson | Nov. 8, 1898 |
| 2,335,848 | Dodwell | Dec. 7, 1943 |

FOREIGN PATENTS

| Number | Country | Date |
|---|---|---|
| 453,832 | France | Apr. 14, 1913 |